(12) United States Patent
Profit et al.

(10) Patent No.: US 7,735,351 B2
(45) Date of Patent: Jun. 15, 2010

(54) ELECTRONIC SHOE WEAR INDICATOR

(75) Inventors: Stephen Profit, Framingham, MA (US); Gary O'Brien, Chandler, AZ (US)

(73) Assignee: MEMSIC, Inc., Andover, MA (US)

( * ) Notice: Subject to any disclaimer, the term of this patent is extended or adjusted under 35 U.S.C. 154(b) by 67 days.

(21) Appl. No.: 12/251,100

(22) Filed: Oct. 14, 2008

(65) Prior Publication Data

US 2009/0095050 A1    Apr. 16, 2009

Related U.S. Application Data

(60) Provisional application No. 60/998,719, filed on Oct. 12, 2007.

(51) Int. Cl.
*G01M 13/00*    (2006.01)

(52) U.S. Cl. ..................... 73/11.04; 73/12.01

(58) Field of Classification Search ..... 73/11.01–11.09, 73/12.01–12.14
See application file for complete search history.

(56) References Cited

U.S. PATENT DOCUMENTS

| | | | |
|---|---|---|---|
| 5,544,432 A * | 8/1996 | Kita | 36/43 |
| 6,578,291 B2 * | 6/2003 | Hirsch et al. | 36/132 |
| 7,225,565 B2 | 6/2007 | DiBenedetto et al. | |
| 7,277,021 B2 | 10/2007 | Beebe et al. | |
| 2001/0008053 A1 * | 7/2001 | Belli | 36/28 |
| 2001/0049890 A1 * | 12/2001 | Hirsch et al. | 36/132 |
| 2002/0048643 A1 * | 4/2002 | Bonk et al. | 428/36.8 |
| 2003/0093248 A1 | 5/2003 | Vock et al. | |
| 2006/0265187 A1 | 11/2006 | Vock et al. | |
| 2007/0137067 A1 * | 6/2007 | Fallon et al. | 36/100 |
| 2007/0203665 A1 | 8/2007 | Darley et al. | |
| 2007/0208530 A1 | 9/2007 | Vock et al. | |
| 2008/0168686 A1 * | 7/2008 | Rosen | 36/136 |
| 2009/0107009 A1 * | 4/2009 | Bishop et al. | 36/114 |
| 2009/0238400 A1 * | 9/2009 | Im | 381/388 |

FOREIGN PATENT DOCUMENTS

WO    WO 00/78170 A1    12/2000

* cited by examiner

*Primary Examiner*—Max Noori
(74) *Attorney, Agent, or Firm*—Weingarten, Schurgin, Gagnebin & Lebovici LLP

(57) ABSTRACT

A system measures an amount of wear in athletic footwear by measuring the amount of shock transmitted to a user. The measured shock is used to indicate an amount of how much cushioning has been lost by the footwear. The amount of wear is proportional to the loss of cushioning and an increase in transmitted shock to the user.

32 Claims, 8 Drawing Sheets

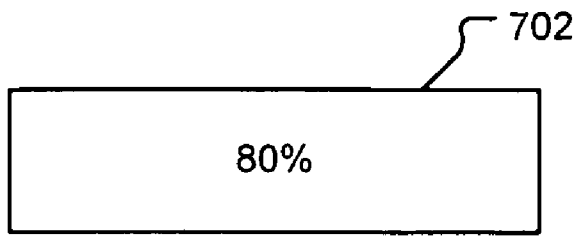
*Fig. 7-A*
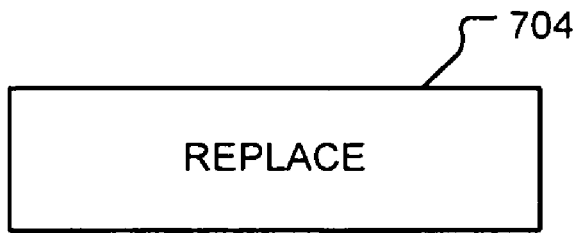
*Fig. 7-B*
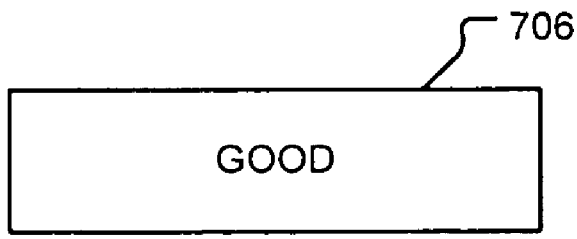
*Fig. 7-C*
*Fig. 7-D*

ELECTRONIC SHOE WEAR INDICATOR

U.S. Provisional Patent Application Ser. No. 60/998,719, filed Oct. 12, 2007, and entitled "Electronic Shoe Wear Indicator," is, in its entirety, incorporated by reference herein for all purposes.

FIELD OF THE INVENTION

This invention relates generally to the field of athletic equipment, and, more specifically, to measuring an amount of cushioning provided by the midsole portion of a running shoe.

BACKGROUND OF THE INVENTION

It used to be that a runner could tell when her running shoes were due for replacement just by seeing that the soles were worn away, the uppers were frayed and that the shoes were, generally, in pretty bad shape. With the improved materials used in today's shoes, however, it has become more difficult to visibly determine when a pair of running shoes has reached the end of its useful lifetime.

The materials used in the soles of running shoes today are so durable that, under most circumstances, they do not show much wear. Thus, the visible condition of the soles is no longer an accurate indication of a shoe's condition, especially where the concern is regarding the amount of cushioning that the shoe will continue to provide.

A running shoe, therefore, may look like it still has a few more miles in it when, in fact, the midsole has become so compressed that the shoe no longer provides a sufficient amount of cushioning for the user. Thus, the concern for a runner is to be able to tell when a pair of running shoes needs to be replaced.

As it is difficult to tell from a visual inspection when a pair of running shoes needs to be replaced, runners either have to be diligent in keeping records regarding the number of miles on each pair of shoes or wait for their knees and back to become so sore that it must be clear that the shoes need to be replaced. While there are certainly many runners out there who keep records for each pair of shoes as to the number of miles, the conditions the miles were run under, the times, etc., it is still not necessarily an accurate indication as to the actual conditions of the shoes. Sadly, many runners continue to use a pair of running shoes well past the point that would be recommended as healthy and only replace the shoes when they experience initial pain symptoms indicating personal physical degradation/damage, and/or can no longer tolerate the discomfort experienced typically in critical joint areas such as the knees and ankles.

What is needed, therefore, is an indicator to show how much cushioning capability is left in a shoe and to indicate to a user when a shoe needs to be replaced because it is not providing, or shortly will no longer provide, the appropriate amount of cushioning and/or energy rebound.

SUMMARY OF THE INVENTION

A system is provided for measuring an amount of wear in athletic equipment, for example, running footwear, by measuring the amount of shock transmitted to a user during use of the equipment. The measured shock value is used to indicate an amount of how much cushioning has been lost by the footwear over time. The amount of wear is proportional to the loss of cushioning and an increase in transmitted shock to the user. The system provides an indication to the user as to the amount of cushioning remaining thereby providing the user with notice as to when the equipment should be replaced.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIGS. 7A-7D are representations of displays; and

DETAILED DESCRIPTION

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

Embodiments of the present invention are directed toward a device for measuring an amount of shock or force transmitted to a user of, for example, a running shoe, during its use. It should be noted that the throughout the present specification, "shock" and "force" will be used interchangeably and mean the same thing, i.e., acceleration due to impact. Shock is represented as acceleration over time and measured by an accelerometer as will be described in more detail below. The measured amount of force is compared to, in one embodiment, an expected amount of force based on parameters entered by a user. An indication is provided as to an amount of cushioning that remains in the running shoe and is presented to the user, in one embodiment, as a visual indication as to the shoe's condition. In this manner, a user of the running shoe is able to determine if new shoes are necessary and/or when new shoes should be purchased.

Figure 1:
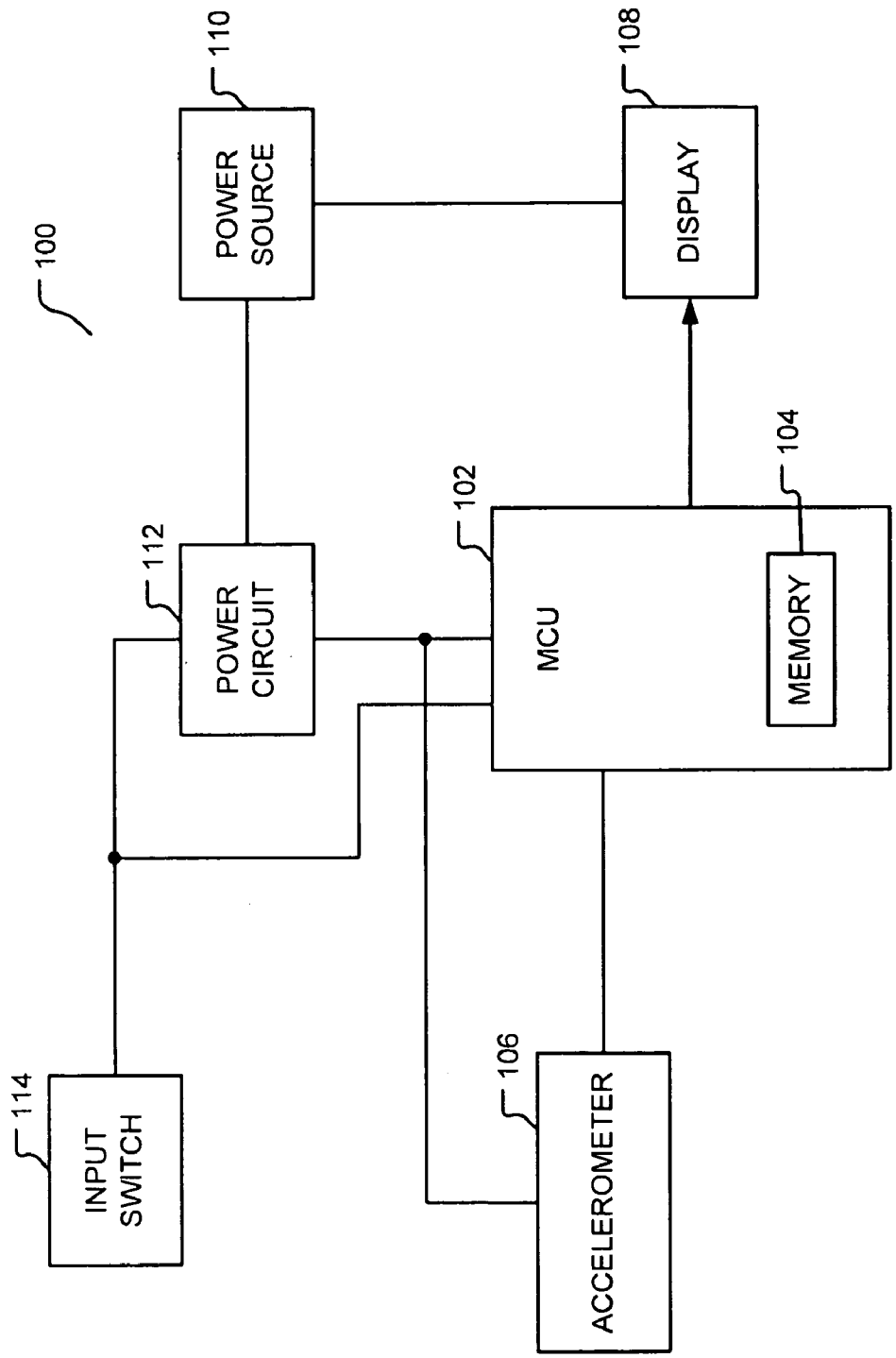
FIG. 1 is a block diagram of a system for evaluating a decrease in cushioning capacity of, in one example, an item of footwear.

Referring now to FIG. 1, a device 100 includes a microcontroller unit (MCU) 102 with a memory 104 for storing data and program instructions. An accelerometer 106 is coupled to the MCU 102 and provides information regarding a shock duration and intensity experienced by, for example, the running shoe by measuring the acceleration as a result of the shock or force. The accelerometer 106 may be a device from Memsic Corporation of Andover, Mass. and could be Memsic Device Model No. MXC62050MP although the present invention is not to be limited to only this specific model or type of accelerometer. Many different types of accelerometers, as is understood by one of ordinary skill in the art, could be used in accordance with the teachings herein.

A display 108 is coupled to the MCU 102 for presenting an indication as to how much cushioning capacity, for example, remains in the running shoe. The MCU 102, accelerometer 106 and the display 108 are powered from a power source 110, for example, a button battery similar to those used in hearing aids and watches. A power circuit 112 is coupled to the MCU 102 and the accelerometer 106 and is used to conserve power by implementing a power down or power save function as known to those of ordinary skill in the art. An input switch 114 is coupled to the MCU 102 and the power circuit 112 in order to provide input information, as will be discussed in more detail below, to each of the power circuit 112 and the MCU 102.

Figure 2:
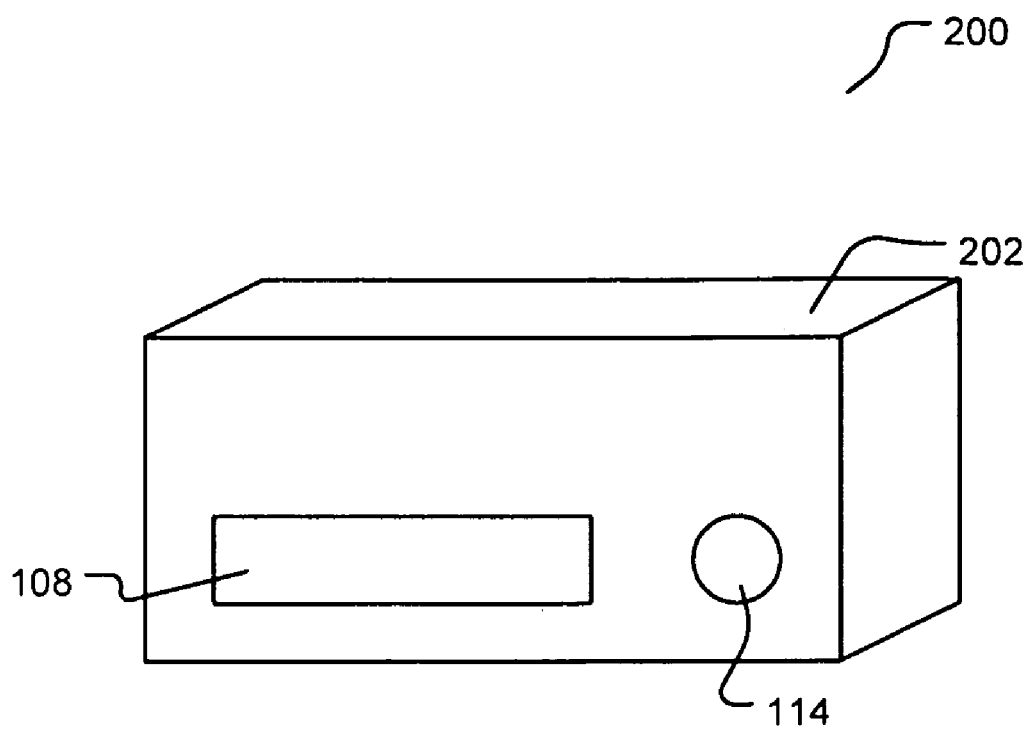
FIG. 2 is a representation of a device incorporating the elements shown in FIG. 1.

The system 100 may be placed in a device 200 as shown in FIG. 2. Here, the device 200 includes a protective case 202 through which the display 108 and the input switch 114 can be viewed and accessed, respectively. The case 202 is made from a material that can withstand exposure to the elements and forces that would be expected in the normal use of, for example, a running shoe. In one embodiment, the case 202 may be made from a plastic, waterproof material. Neoprene, PVC, and similar materials known to those of ordinary skill in the art can also be used.

Figure 3:
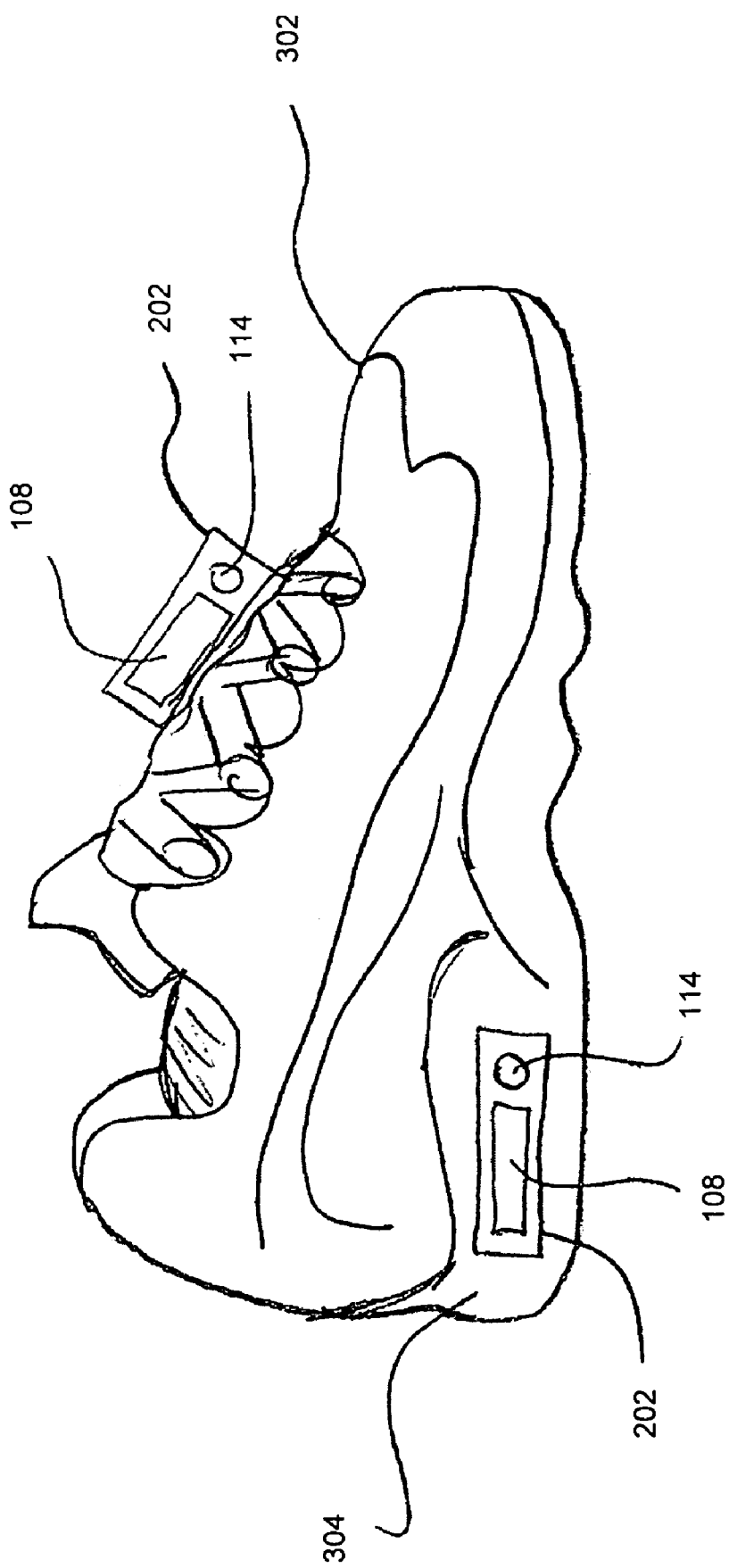
FIG. 3 is a representation of locations for the device of FIG. 2 with respect to a running shoe.

Referring now to FIG. 3, a running shoe 302 includes a midsole portion 304 to provide shock absorption, support and protection for the foot as known in the art of shoe-making. The midsole 304 is often constructed of a combination of a materials, for example, Phylon, polyurethane, Phylite and EVA. This listing of materials is not exclusive nor is it germane to embodiments of the present invention, however, one of ordinary skill in the art will understand that there are other materials and/or structures that provide adequate cushioning and/or shock rebounding.

In order for the system 100 to measure an impact force and, therefore, an amount of cushioning and/or shock rebounding provided by the shoe 302, the system 100 is positioned such that the cushioning material, for example, the midsole 304, is between the force and the system 100. In one embodiment of the present invention, the device 200 with the system 100 disposed therein is located on an instep, i.e., over the laces, of the running shoe 302. In this embodiment, the device 200 may be removed and used on a next pair of running shoes. Alternatively, the accelerometer 106 may be placed in such a location as to sense the "cushioned" force and the other components located elsewhere on the shoe.

It should be noted that the accelerometer 106 is measuring an intensity and duration of a force transmitted, after having been "cushioned" by the midsole material, to the runner. It is expected that, during the lifetime of a running shoe, the midsole material will compress and, therefore, transmit more force as the material is compressed. This degradation of cushioning is one factor in determining whether the shoe needs to be replaced. Thus, embodiments of the present invention provide more than a count of the number of foot-falls experienced by a pair of shoes.

In an alternate embodiment, also represented in FIG. 3, the device 200 may be placed within the midsole portion 304. When the device 200 is placed in the midsole portion 304, the display portion 108 and the input button 114 are oriented so as to be viewed and accessed, respectively, by a user. It should be noted that the two locations for the placement of the device 200, are both shown in one figure for convenience of description only.

As an overview, in one embodiment, a method of operation 400 implemented by the MCU 102 in accordance with instructions stored in the memory 104 has three main functions. There is a setup function, a measure function and a display function. The functions are chosen, in one embodiment, via operation of the input switch 114 by a user. One embodiment of such operation of the input switch 114 will be described in more detail below.

In operation, the MCU 102, in accordance with the instructions stored in the memory 104, waits for input from the switch, step 402. At step 404 it is determined whether or not an input has been received and if an input from the switch has not been received, then control passes to step 406. As one embodiment of the present invention is being powered by a battery as the power source 110, a power-saving function is applied. Thus, at step 406, it is determined whether or not a predetermined time period has been exceeded since there has been an input from the switch. If the timeout is not exceeded, then control passes back to step 402 to await input from the switch. If, however, the time period has been exceeded, i.e., "timed-out," then control passes to step 408 where the system 100 goes into a sleep mode to be awakened upon a subsequent action.

The subsequent action provided in order to awaken the system, in one embodiment, could be the operation of the input switch for a preset duration, for example, holding down the switch for a particular length of time.

Returning now to step 404, if an input is received, then control passes to step 410, where it is determined as to what type of input has been received: setup, measure or display. An example of one embodiment as to how the mode of operation is chosen will be described in more detail below.

If the input from the switch indicates that the setup mode should be entered, then control passes to step 412 where the user's height $U_H$ and the user's weight $U_W$ are accepted as entered via the input switch. Subsequently, step 414, the user height $U_H$ and user weight $U_W$ data are stored within the memory 104. Optionally, at step 416, a shock limit value $S_L$ may be accepted after having been inputted via the input switch 114 by the user. Alternatively, the shock limit $S_L$ may be already stored in the memory 104. The shock limit $S_L$ is a factor used in determining how much compression is remaining in the midsole 304 and is based on the shoe's construction, i.e., at least the materials used in the midsole 304. In some instances, the shock limit $S_L$ may be already stored in the memory 104 when the shoe is manufactured with the device 202 installed in the midsole. Alternatively, it may have to be entered by the user.

After step 416, control passes back to step 402 to await further input from the switch 114.

Returning now to step 410, if the received input indicates that the measure mode should be entered, then control passes to step 418 where a measurement time interval $T_m$ is started. At step 420, a shock measurement $SM_x$ is taken. At step 422 the shock measurement $SM_x$ is processed while the user is, for example, running or otherwise using the shoes. This processing may incorporate either averaging over a number of shock measurements $SM_x$, or by applying some other type of function, for example, taking out the high and low values and then averaging the remainder, or the like. One of ordinary skill in the art will understand that there are any number of different ways of processing these shock measurements $SM_x$. At step 424 it is determined whether or not the time interval $T_m$ has expired, and if not, then control passes back to step 420. If, on the other hand, the time interval $T_m$ has expired, then control passes to step 426 where the processed shock measurements $SM_x$ are stored. As above, this storing step may involve only storing one of the processed shock measurements $SM_x$ or some other representation of the measurements taken during the measurement time interval $T_m$. Subsequent to step 426, control passes to step 402 to await input from the switch 114.

Alternatively, subsequent to step 426, control may pass to step 428 and, therefore, display the wear factor WF.

Returning once again to step 410, if the input from the switch 114 indicates that the display mode is to be entered, then control passes to step 428 where one embodiment of the present invention incorporates height and weight scale factors $SF_H$, $SF_W$, corresponding to the user height $U_H$ and user weight $U_W$ inputs, respectively. At step 430, the system retrieves the stored shock measurements $SM_x$ that were taken in the most recent time interval $T_m$. The shock limit $S_L$ is retrieved at step 432, whether it has been previously input by the user or was already set.

A wear factor WF is calculated as a function of the height scale factor $SF_H$, the weight scale factor $SF_W$, the shock limit $S_L$ and the shock measurement $SM_x$ at step 434. In alternate embodiments, additional information, such as, but not limited to, a user's gender or age, can enhance the algorithm's determination of wear.

At step 436 the calculated wear factor WF is displayed on the display 108 after which control passes back to step 402 for further input via the switch 114 from the user. The displaying of the wear factor WF may be for a predetermined duration, after which the display turns off in order to conserve power.

Figure 5:
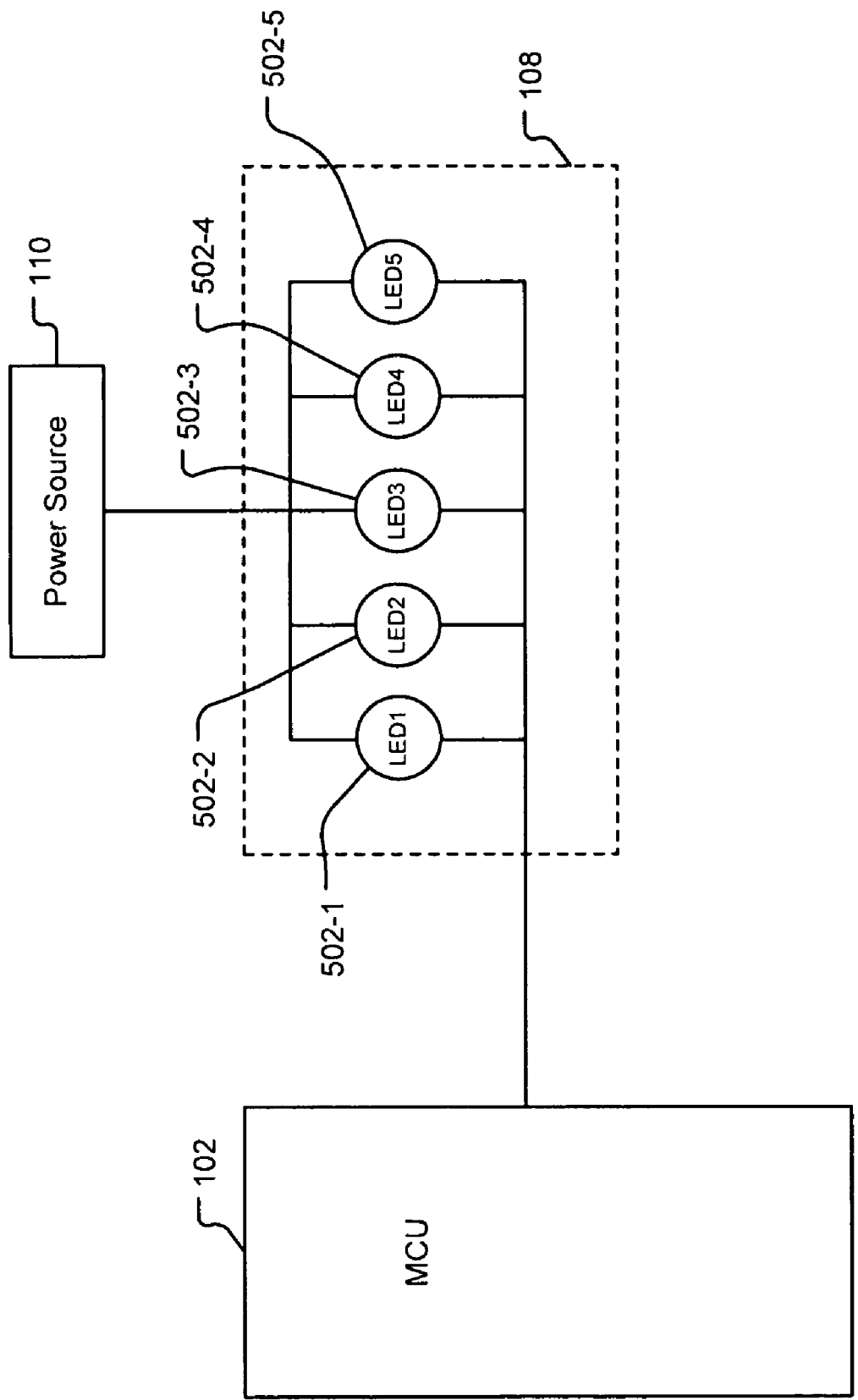
FIG. 5 is an alternate embodiment of a display portion.

In one embodiment of the present invention, the display 108 comprises five LEDs, 502-1-502-5, to represent the wear factor WF. As shown in FIG. 5, the LEDs 502 are coupled to the MCU 102 and to the power source 110. Depending upon the value of the wear factor WF, various ones of the LEDs 502 will be illuminated as will be described in more detail below.

Figure 4:
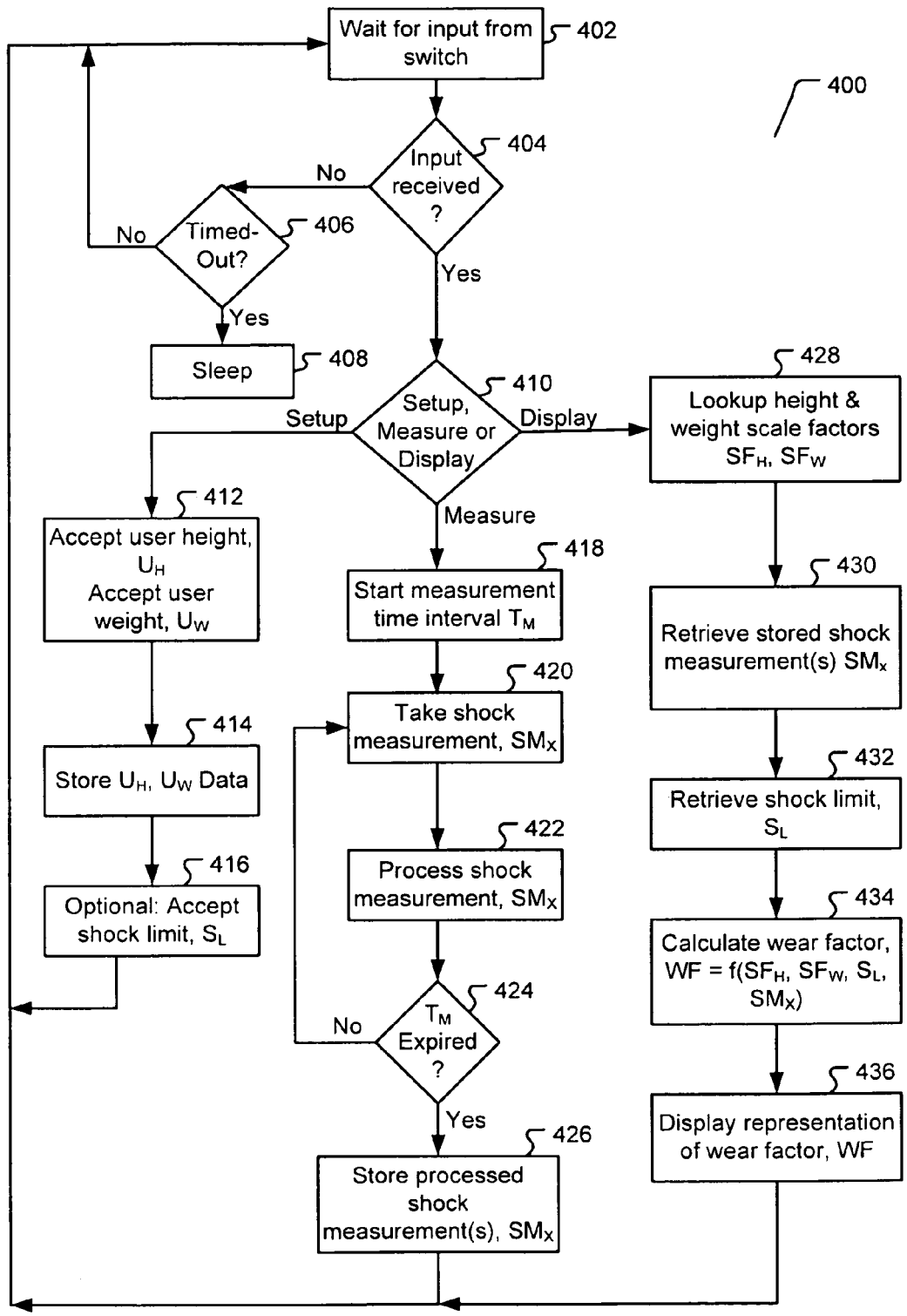
FIG. 4 is a flowchart of a method in accordance with one embodiment of the present invention.

In one embodiment of the present invention, the five LEDs 502 are used to display the wear factor WF as well as provide directions to a user for inputting information in the setup, measure and display modes as described above with regard to the method 400 in FIG. 4.

In an embodiment implementing the LEDs 502, the setup mode would be entered when it has been detected that the input switch has been pressed and held for some predetermined period of time, for example, five seconds A first LED 502-1 would start flashing to indicate to the user that the setup mode has been entered and that the system is expecting a value to be entered for the user height $U_H$ data.

Via operation of the input switch 114, a height range within which the user fits can be identified. In one embodiment of the present invention, the user would be provided with written instructions that come with the running shoes or device, for example, a pamphlet identifying ranges of heights. Accordingly, the input switch 114 can be repeatedly pressed to cycle through these height ranges. In this exemplary embodiment, there would be five height ranges where each of the LEDs 502-1-502-5 corresponds to a specific height range. Pushing the input switch 114 will scroll through the LEDs which, in turn are lighted one at a time to indicate which height range can be chosen. If, for example, the second height range is desired, as represented by the second LED 502-2, then once operation of the switch 114 causes the second LED 502-2 to flash, then the switch is pressed and held for another predetermined amount of time, for example, two seconds, until the second LED 502-2 flashes to indicate that the height information has been received.

Next, the weight information is input by the user in a similar manner where each LED 502-1-502-5 represents a particular weight range as would be indicated to the user in the instruction manual. Similar to the inputting of the height range, pressing the switch 114 cycles through the LEDs until the LED corresponding to the desired weight range is flashing. The switch 114 would then be pressed and held for a predetermined period of time, for example, five seconds, until all of the LEDs 502-1-502-5 flash to indicate that the setup mode has been exited after entering the height and weight information.

The entering the of the shock limit $S_L$, if not already hard-wired or stored in the system, can be similarly entered via the operation of the input switch 114 by a user in combination with the LEDs 502 flashing or otherwise indicating a value.

Of course, one of ordinary skill in the art will understand that the number of ranges are not limited to only five as various combinations of lighted LEDs 502 can be displayed and that the number of LEDs shown here is only for purposes for explanation and is not to be considered limiting.

In order to enter the measure mode of operation, in one embodiment of the invention, the input switch 114 may be pressed and held for a predetermined period of time, for example, three seconds, until the fifth LED 502-5 begins to flash to indicate that the system is active and ready to measure impact. Once the system is in the measure mode, then the activity, for example, walking, jogging, running, working, etc., is begun and the measurements, steps 418-426, will be implemented.

Alternatively, the display mode may be entered directly from the measure mode.

To enter the display mode, i.e., to present to the user how much wear is left in the shoe, the input switch 114 may be pressed for a relatively short period of time with respect to the times described above as necessary to enter into either of the setup or measure modes, for example, one second, and the LEDs 502-1-502-5 will then light in order to indicate the amount of wear that is remaining.

In one embodiment of the present invention, the LEDs 502-1-502-5 are lit to indicate a percentage of an amount of wear that remains. Accordingly, the fifth LED 502-5 will be lit if the amount of wear is greater than 80% remaining; the fourth LED 502-4 will be lit if the amount of wear is greater than 60% remaining; the third LED 502-3 will be lit if the amount of wear is greater than 40% remaining; and the second LED 502-2 will be lit if there is greater than 20% wear remaining. If there is less than 20% wear remaining, then only the first LED 502-1 will be lit. Thus, for a shoe with a 75% wear factor WF, LEDs 502-1-502-4 will be lit.

Of course, one of ordinary skill in the art will understand that the foregoing representation of the amount of wear remaining using the five LEDs 502-1-502-5, can be represented in any one of a number of ways and that the above described implementation is only one of the ways. For example, each of the LEDs could be assigned a range and only one LED would be lit to indicate how much wear remains.

Still further, LEDs capable of displaying different colors may be implemented, for example, LEDs that can present green, yellow or red, depending on how they are driven or powered. The use of different colors to represent the condition of the shoe would then be a design choice limited only by the power requirements and/or budget considerations for the device.

Figure 6:
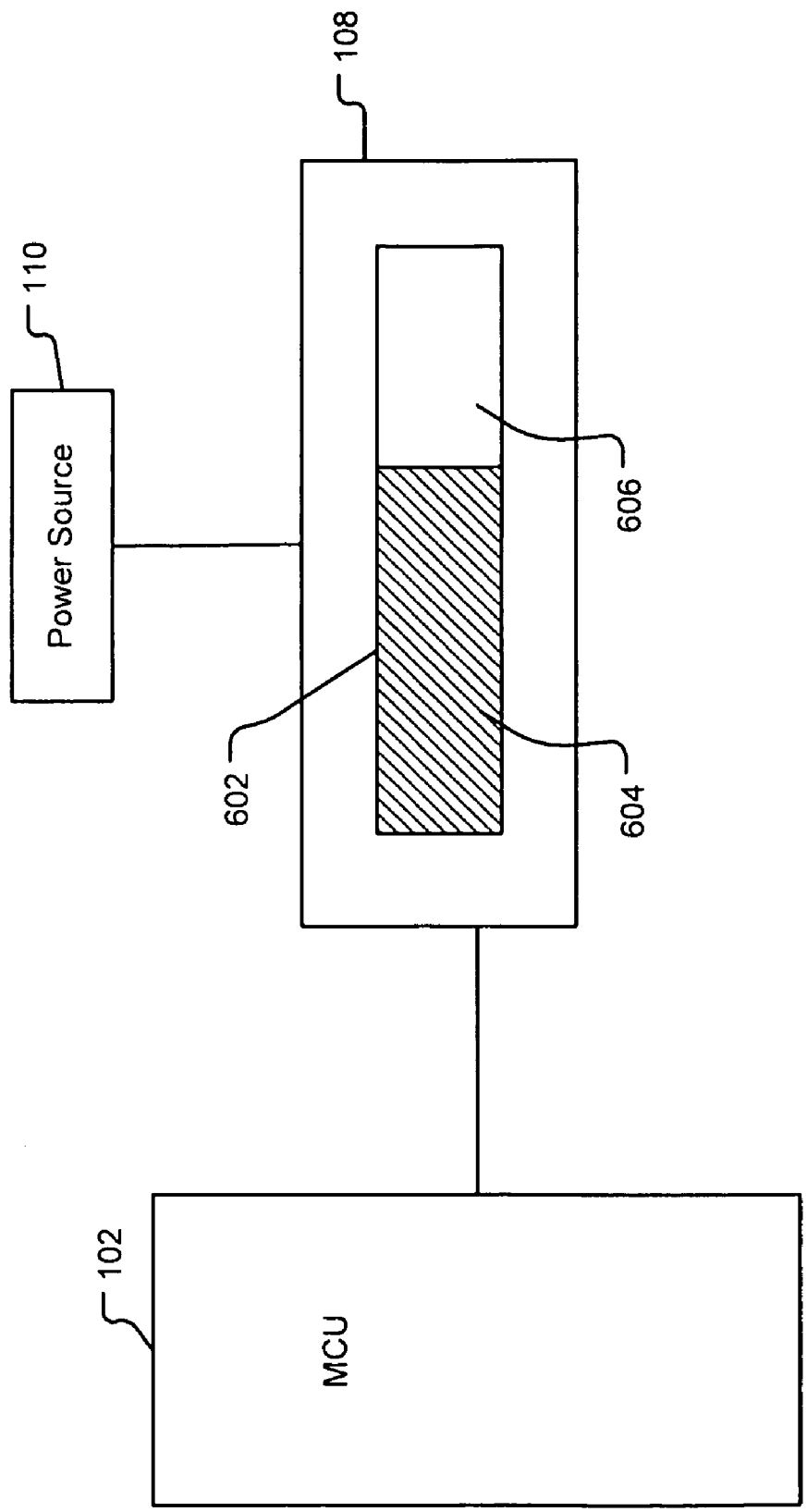
FIG. 6 is another embodiment of a display portion.

Referring now to FIG. 6, an alternate embodiment of the present invention includes a display 108 incorporating a graphic icon 602 having a first part 604 and a second part 606 to represent, graphically, an amount of wear remaining in the shoe. In one embodiment, the first part 604 of the icon 602 may represent the amount of wear remaining with the second part 606 representing the amount of wear that has been depleted. In one embodiment, an LCD display is used to present the information.

Alternate representations of the display 108 are also contemplated by embodiments of the present invention. Referring now to FIG. 7-A, a display 702 may present the amount of wear remaining, as a function of the wear factor WF, in an alpha-numeric display representing the value. In addition, referring to FIG. 7-B, a display 704 may provide a textual representation of the condition of the shoe with an explicit instruction to, for example, "REPLACE" the shoe or indicate, referring now to FIG. 7-C, that the condition of the shoe is still "GOOD" as shown by a representation 706. Further, referring now to FIG. 7-D, a representation 708 may incorporate the manufacturer's logo, the representation of which indicates that the shoe is still sound for its intended use.

Figure 8:
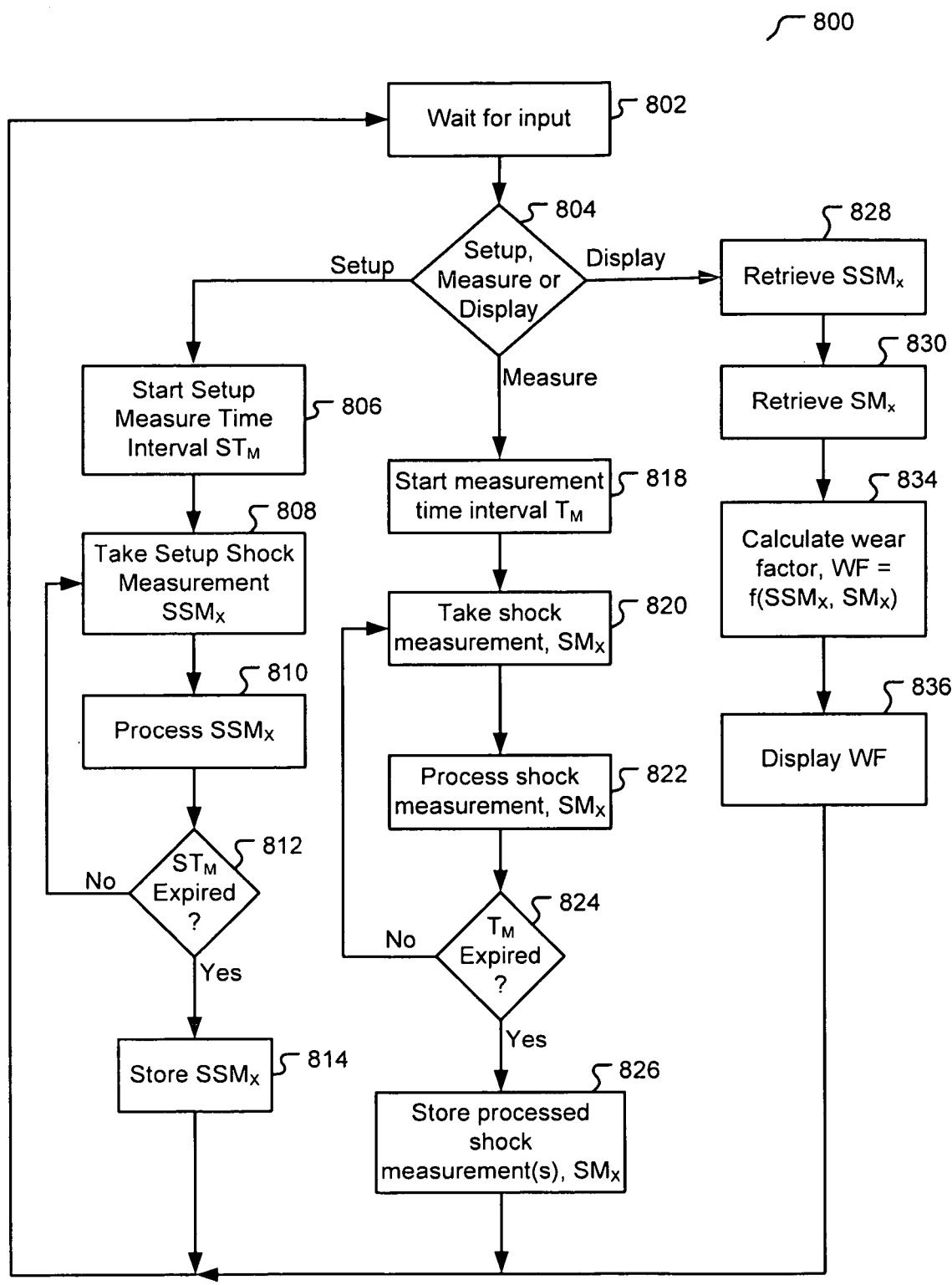
FIG. 8 is a flowchart of a method in accordance with another embodiment of the present invention.

A method of operation 800, referring now to FIG. 8, in accordance with another embodiment of the present invention, implements the setup, measure, and display functions in a manner that does not require the entry of a user's weight or height information and will now be described.

In operation, the MCU 102, in accordance with the instructions stored in the memory 104, waits for input from the switch, step 802. Waiting for input from the switch can be implemented by the steps described above with respect to the method 400 shown in FIG. 4. These steps, however, are not shown nor described here in order to simplify the flowchart.

At step 804, once input has been received, it is determined as to what mode of operation has been indicated: setup, measure or display.

If the input from the switch indicates that the setup mode should be entered, then control passes to step 806 where a setup measurement time interval $ST_m$ is started. During the setup measurement time interval $ST_m$, the user is instructed to walk, run, jog, etc., in other words, use the shoes as indicated. Alternatively, the user may be instructed to walk at a normal pace, and on a firm surface, i.e., an activity that can be repeated and accessed at another time, as will be discussed in more detail below.

While the user is, for example, walking at a normal pace, at step 808, a setup shock measurement $SSM_x$ is taken. At step 804, the setup shock measurement $SSM_x$ is processed. This processing may incorporate either averaging over a number of setup shock measurements $SSM_x$, or by applying some other type of function, for example, taking out the high and low values and then averaging the remainder, or the like. One of ordinary skill in the art will understand that there are any number of different ways of processing these setup shock measurements $SSM_x$. At step 812, it is determined whether or not the setup time interval $ST_m$ has expired, and if not, then control passes back to step 808. If, on the other hand, the setup time interval $ST_m$ has expired, then control passes to step 814 where the processed setup shock measurement(s) $SSM_x$ are stored. As above, this storing step may involve only storing one of the processed setup shock measurements $SSM_x$ or some other representation of the measurements taken during the setup measurement time interval $ST_m$. Subsequent to step 814, control passes to step 802 to await input from the switch 114.

Returning now to step 804, if the received input indicates that the measure mode should be entered, then control passes to step 818 where a measurement time interval $T_m$ is started. During the setup measurement time interval $ST_m$, the user is instructed to walk, run, jog, etc., in other words, use the shoes as indicated or in the same manner, and on the same surface type, as was used during the setup time interval. For example, the user may be instructed to walk at a normal pace if that is what was expected of the user during the setup phase. At step 820, a shock measurement $SM_x$ is taken. At step 822 the shock measurement $SM_x$ is processed. This processing may incorporate either averaging over a number of shock measurements $SM_x$, or applying some other type of function, for example, taking out the high and low values and then averaging the remainder, or the like. One of ordinary skill in the art will understand that there are any number of different ways of processing these shock measurements $SM_x$. At step 824 it is determined whether or not the time interval $T_m$ has expired, and if not, then control passes back to step 820. If, on the other hand, the time interval $T_m$ has expired, then control passes to step 826 where the processed shock measurements $SM_x$ are stored. As above, this storing step may involve only storing one of the processed shock measurements $SM_x$ or some other representation of the measurements taken during the measurement time interval $T_m$. Subsequent to step 826, control passes to step 802 to await input from the switch 114.

Alternatively, after step 826, control may pass directly to step 828 to display the wear factor WF after taking the measurements.

Returning once again to step 804, if the input from the switch 114 indicates that the display mode may be entered, then control passes to step 828 where the stored setup shock measurements $SSM_x$ are retrieved. At step 830, the system retrieves the stored shock measurements $SM_x$ that were taken during the most recent time interval $T_m$. A wear factor WF is calculated as a function of the setup shock measurements $SSM_x$ and the shock measurement $SM_x$ at step 834. In one embodiment, the wear factor WF is a function of a difference between the setup shock measurements $SSM_x$ and the stored shock measurements $SM_x$.

It is assumed, with the same setup and measure activities by the same user, that, over time, the amount of shock that is measured will increase as the midsole compresses due to the loss of cushioning capacity. Material compressibility typically degrades as the number of compression cycles accumulates over time. As the difference between the initial measurement and subsequent measurements increases, the amount of wear and, therefore, a remaining amount of compression can be determined.

At step 836 the calculated wear factor WF is displayed on the display 108 after which control passes back to step 802 for further input via the switch 114 from the user. The displaying of the wear factor WF may be for a predetermined duration, after which the display turns off in order to conserve energy.

While the foregoing embodiments have been described in the context of a running shoe, it is envisioned that embodiments of the present invention may be used in other apparatuses that are intended to cushion a user from force or shock. These include, in a non-limiting representation, boxing gloves, head gear to be used by a boxer, and gymnastic pads used to cushion gymnasts in the event of a fall off of apparatus, and the like. Applications of embodiments of the present invention are, therefore, advantageous in any system where a cushion or cushioning mechanism is provided in order to protect a user from the consequences of a repeated force. Embodiments of the present invention measure a degradation in an amount of cushioning protection provided by cushioning material or the like that is subjected to continuous and/or repeated impacts.

The wear factor value WF is presented to the user of, for example, a running shoe, in order for the user to make the determination as to when, or whether or not, to replace the shoe, as described in one or more embodiments above. While this type of "feedback" involves the user, the wear factor WF may be used in a feedback loop within the shoe where the value is not necessarily presented to the user. "Active" shoes, that is, shoes in which mechanisms are provided to change one or more characteristics of the shoe during use, for example, shoe stability or stiffness, are known in the art. It is contemplated that the determined wear factor WF may be incorporated as a factor for determining how to modify a characteristic of an active shoe without ever presenting the wear factor WF to the user. Thus, the amount of wear, i.e., loss of cushioning, will be used as a factor in how to modify a shoe's mechanical parameters.

It is known that, over time, a cushioning material will compress and lose its ability to protect a user from an applied force. Serious injury may result from a cushion's decreased ability to insulate a user from force, for example, running shoes that have lost the ability to cushion and which, therefore, transmit more of the "road shock" to a runner's ankles, knees, etc. Further, boxing headgear that has lost its ability or capacity to insulate a boxer's head from concussive blows received from an opponent can also be dangerous and lead to injury or death.

Advantageously, embodiments of the present invention determine an amount of loss of cushioning or shock absorption capacity. The amount of degradation, e.g., compression of the midsole of a running shoe, is determined by comparing the measured shock to an expected value based on user-set parameters.

Embodiments of the above-described invention may be implemented in all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of determining an amount of wear of a shoe, the method comprising:
   measuring a first amount of shock transmitted by the athletic shoe;
   retrieving a shock limit factor $S_L$ as a function of a material in a midsole of the athletic shoe;
   retrieving a weight factor $U_W$ and a height factor $U_H$; and
   determining a wear factor value WF representing the amount of wear of the shoe as a function of the shock limit $S_L$, the weight factor $U_W$, the height factor $U_H$, and the measured first amount of transmitted shock.

2. The method of claim 1, wherein the weight factor $U_W$ and the height factor $U_H$ are input by a user of the shoe and correspond, respectively, to a weight and height of the user.

3. The method of claim 1, wherein measuring the first amount of transmitted shock comprises:
   measuring at least one of: an intensity and a duration of the transmitted shock.

4. The method of claim 3, wherein at least one of: measuring an intensity and measuring a duration of the first transmitted shock comprises:
   measuring acceleration.

5. The method of claim 1, wherein measuring the first amount of transmitted shock comprises:
   determining an average amount of transmitted shock over a predetermined amount of time.

6. The method of claim 5, further comprising:
   determining an average intensity and an average duration of the transmitted shock over the predetermined amount of time.

7. The method of claim 1, further comprising:
   displaying a representation of the wear factor value WF.

8. The method of claim 7, further comprising:
   displaying the representation of the wear factor WF by operation of a display portion coupled to the shoe.

9. The method of claim 1, wherein measuring the first amount of transmitted shock comprises:
   measuring acceleration.

10. The method of claim 1, further comprising:
    modifying one or more characteristics of the shoe as a function of the determined wear factor WF.

11. A method of determining cushioning capacity of a device, the method comprising:
    measuring, with a first sensor, an initial shock value during a first time of operation of the device in a predetermined manner;
    storing the initial measurement of shock value;
    operating the device in the predetermined manner at a second time subsequent to the first time of operation;
    measuring, with the first sensor, an amount of shock transmitted by the device during the operation of the device; and
    determining the cushioning capacity of the device as a function of the measured amount of shock transmitted by the device and the initial measurement of shock value.

12. The method of claim 11, wherein the cushioning capacity is determined as a function of a difference between the previously stored initial measurement of shock value and the measured amount of shock.

13. The method of claim 11, wherein:
the previously stored initial measurement of shock value is generated at a time prior to the measured amount of shock.

14. The method of claim 13, wherein the previously stored initial measurement of shock value is determined by measuring an amount of shock transmitted by the device while being previously operated in the predetermined manner of operation.

15. The method of claim 11, wherein the device comprises a shoe and wherein operating in a predetermined manner comprises:
a user walking in the shoe.

16. The method of claim 11, wherein the device comprises a head protection portion, and wherein:
the predetermined manner comprises striking the head protection portion with a plurality of blows.

17. The method of claim 11, further comprising:
displaying a representation of the cushioning capacity.

18. The method of claim 11, wherein measuring the amount of transmitted shock comprises:
measuring an intensity and a duration of the transmitted shock.

19. The method of claim 18, wherein at least one of: measuring an intensity and measuring a duration of the transmitted shock comprises:
measuring acceleration.

20. The method of claim 11, wherein measuring the amount of transmitted shock comprises:
measuring acceleration.

21. The method of claim 11, further comprising:
modifying one or more characteristics of the device as a function of the determined cushioning capacity.

22. The method of claim 15, further comprising the user walking in the shoe on a firm surface.

23. A system for determining an amount of wear of an athletic shoe, comprising a first memory containing a wear measurement program and a first processor operative to execute said wear measurement program, the wear measurement program comprising:
program code for measuring a first amount of shock transmitted by the athletic shoe;
program code for retrieving a shock limit factor $S_L$ corresponding to a material in a midsole of the athletic shoe;
program code for retrieving a weight factor $U_W$ and a height factor $U_H$; and
program code for determining a wear factor value WF as a function of the shock limit $S_L$, the weight factor $U_W$, the height factor $U_H$, and the measured first amount of transmitted shock.

24. The system of claim 23, further comprising an accelerometer having an output coupled to the first processor.

25. The system of claim 23, wherein the wear measurement program further comprises:
program code for receiving the weight factor $U_W$ and the height factor $U_H$ as input from a user of the athletic shoe and which correspond, respectively, to a weight and height of the user.

26. The system of claim 23, wherein the wear measurement program further comprises:
program code for measuring an intensity of the transmitted shock; and
program code for measuring a duration of the transmitted shock.

27. The system of claim 26, wherein at least one of: the program code for measuring an intensity of the transmitted shock and the program code for measuring a duration of the transmitted shock comprises:
program code for measuring acceleration.

28. The system of claim 23, wherein the wear measurement program further comprises:
program code for determining an average amount of transmitted shock over a predetermined amount of time.

29. The system of claim 28, wherein the wear measurement program further comprises:
program code for determining an average intensity and an average duration of the transmitted shock over the predetermined amount of time.

30. The system of claim 23, further comprising a display portion coupled to the processor, wherein the wear measurement program further comprises:
program code for displaying a representation of the wear factor value WF by operation of the display portion.

31. The system of claim 23, wherein the program code for measuring the amount of transmitted shock comprises:
program code for measuring acceleration.

32. The system of claim 23, further comprising:
program code for modifying one or more characteristics of the running shoe as a function of the determined wear factor value.

* * * * *

UNITED STATES PATENT AND TRADEMARK OFFICE
CERTIFICATE OF CORRECTION

| | | Page 1 of 1 |
|---|---|---|
| PATENT NO. | : 7,735,351 B2 | |
| APPLICATION NO. | : 12/251100 | |
| DATED | : June 15, 2010 | |
| INVENTOR(S) | : Stephen Profit et al. | |

It is certified that error appears in the above-identified patent and that said Letters Patent is hereby corrected as shown below:

Column 2, at line 31, new paragraph should read --U.S. Provisional Pat. Application Ser. No. 60/998,719 filed Oct. 12, 2007, and entitled, "Electronic Shoe Wear Indicator," is, in its entirety, incorporated by reference herein for all purposes.--.

Signed and Sealed this
Fourth Day of October, 2011

David J. Kappos
*Director of the United States Patent and Trademark Office*